(12) United States Patent
Mutalikdesai et al.

(10) Patent No.: US 10,984,199 B2
(45) Date of Patent: *Apr. 20, 2021

(54) UNSUPERVISED TARGETED SENTIMENT ANALYSIS USING DEPENDENCY PARSING AND LINGUISTIC HEURISTICS

(71) Applicant: International Business Machines Corporation, Armonk, NY (US)

(72) Inventors: Mandar Mutalikdesai, Bengaluru (IN); Anagha M, Bengaluru (IN); Sheetal Srivastava, Bengaluru (IN); Lavina Durgani, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 44 days.

This patent is subject to a terminal disclaimer.

(21) Appl. No.: 16/198,650

(22) Filed: Nov. 21, 2018

(65) Prior Publication Data

US 2020/0159830 A1 May 21, 2020

(51) Int. Cl.
*G06F 40/30* (2020.01)
*G06F 40/211* (2020.01)
(Continued)

(52) U.S. Cl.
CPC ............ *G06F 40/30* (2020.01); *G06F 40/295* (2020.01); *G06N 20/00* (2019.01)

(58) Field of Classification Search
CPC ...... G06F 40/20; G06F 40/205; G06F 40/211; G06F 40/216; G06F 40/221;
(Continued)

(56) References Cited

U.S. PATENT DOCUMENTS 9,009,024 B2   4/2015   Zhang et al.
9,336,205 B2   5/2016   Moilanen et al.
(Continued)

OTHER PUBLICATIONS

Bang et al ("Sentiment Classification for Hotel Booking Review Based on Sentence Dependency Structure and Sub-Opinion Analysis", IEICE Trans. Inf. & Syst., vol. E101-D, No. 4, Apr. 2018.*
(Continued)

*Primary Examiner* — Leshui Zhang
(74) *Attorney, Agent, or Firm* — Diana R. Gerhardt; Jack V. Musgrove

(57) ABSTRACT

Sentiment analysis is targeted toward a specific subject of interest (or selected subjects) in a passage of natural language text. A dependency tree is generated for the passage, and subtrees are found that have sentiment polarities which contribute to the subject(s) of interest. A targeted sentiment score is computed for the subject(s) of interest based on sentiment expressed in those subtrees. Consecutively occurring nouns in the passage are collapsed into a noun phrase, as are possessives with ensuing nouns. The sentiment expressed in a given subtree can be modified using various linguistic heuristics. For example, sentiment polarity which is modified by a negation word may be inverted, sentiment polarity which is modified by an intensifying word may be increased, or sentiment polarity which is modified by a diluting word may be decreased.

18 Claims, 6 Drawing Sheets

(51) Int. Cl.
*G06F 40/295* (2020.01)
*G06N 20/00* (2019.01)

(58) Field of Classification Search
CPC .... G06F 40/226; G06F 40/232; G06F 40/237; G06F 40/242; G06F 40/247; G06F 40/253; G06F 40/258; G06F 40/263; G06F 40/268; G06F 40/274; G06F 40/279; G06F 40/284; G06F 40/289; G06F 40/295; G06F 40/30; G06F 40/35; G06F 16/21; G06F 16/211; G06F 16/219; G06F 16/116; G06F 16/214; G06F 16/254; G06F 16/258; G06F 16/84; G06F 16/86; G06N 20/00
USPC ........ 704/1–2, 4–9; 707/790, 791, 793, 796, 707/797, 800, 803, 804, E17.012, E17.05, 707/E17.087
See application file for complete search history.

(56) References Cited

U.S. PATENT DOCUMENTS

| | | | |
|---|---|---|---|
| 9,690,772 B2 | 6/2017 | Brun et al. | |
| 2013/0268262 A1* | 10/2013 | Moilanen | G06F 40/30 704/9 |

OTHER PUBLICATIONS

Batra, Siddharth, et al., "Entity Based Sentiment Analysis on Twitter", Science, v.9, issue 4, pp. 1-12 (2010).

Buddhitha, Prasadith, et al., "Dependency-based Topic-Oriented Sentiment Analysis in Microposts", Proc. Symposium on Information Management and Big Data (2015).

Dragoni, Mauro, "Extracting Linguistic Features from Opinion Data Streams for Multi-Domain Sentiment Analysis", Proc. Int'l. Workshop on Emotions, Modality, Sentiment Analysis and the Semantic Web (2017).

IBM Watson Financial, "Deployment topology" [online], retrieved on Nov. 21, 2018, from the Internet URL: https://www.ibm.com/support/knowledgecenter/en/SSCKRH_1.0.1/fcdd/c_component_architecture.html.

ip.com, "A System and Method for a generic, domain customizable, aspect based aggregation of sentiments from texl documents", Publication No. IPCOM000241518D (2015).

ip.com, "Aggregation and Analysis of Multiple Social Media Provider Content for Targeted Advertising", Publication No. IPCOM000241625D (2015).

ip.com, "Method for predicting social media sentiment for images", Publication No. IPCOM000253538D (2018).

Jiang, Long, et al., "Target-dependent Twitter Sentiment Classification", Pro. Assoc. for Computational Linguistics: Human Language Technologies, v. 1. pp. 151-160 (2011).

Natural Language Toolkit Project, "NLTK 3.3 documentation" [online], retrieved on Oct. 5, 2018, from the Internet URL: http://www.nltk.org.

Pavlopoulos, Ioannis, "Aspect Based Sentiment Analysis" [online], retrieved on Oct. 5, 2018, from the Internet URL: http://www2.aueb.gr/users/ion/docs/pavlopoulos_phd_thesis.pdf.

Saeidi, Marzieh, et al., "SentiHood: Targeted Aspect Based Sentiment Analysis Dataset for Urban Neighbourhoods", Proc. Int'l. Conf. on Computational Linguistics: Technical Papers, pp. 1546-1556 (2016).

SentiWordNet, "SentiWordNet" [online], retrieved on Oct. 5, 2018, from the Internet URL: http://sentiwordnet.isti.cnr.it.

* cited by examiner

| Key | Type | Size | Value |
|---|---|---|---|
| SOI | list | 2 | [('bailout', -0.4), ('lawsuit', -0.9)] |
| SOI and four former executives | list | 3 | [('charged', -0.8), ('conspiracy', -2.4), ('fraud', -2.8] |
| The Serious Fraud Office | list | 2 | [("Serious', -0.3), ('Fraud', -2.8)] |
| The four men | list | 2 | [('charged', -0.8), ('crisis', -3.1)] |
| a bailout | list | 1 | [('avoid', -1.2)] |
| billions | list | 1 | [('losses', -1.7)] |
| ex-CEO | list | 3 | [('charged', -0.8), ('rescue', 2.3), ('crisis', -3.1)] |
| fraud | list | 1 | [('commit', 1.2)] |
| the Middle East Roger Jones | list | 1 | [('charges', -1.1)] |

UNSUPERVISED TARGETED SENTIMENT ANALYSIS USING DEPENDENCY PARSING AND LINGUISTIC HEURISTICS

STATEMENT REGARDING PRIOR DISCLOSURE BY THE INVENTORS

The subject matter of the present application was included in the implementation of a software product known as Financial Crimes Due Diligence FCI 1.0.2 release by the Watson™ Financial Services group of International Business Machines Corporation in December of 2017.

CROSS-REFERENCE TO RELATED APPLICATION

This application is related to U.S. patent application Ser. No. 16/198,660 entitled "UNSUPERVISED SENTIMENT ANALYSIS FOR MULTIPLE SUBJECTS OF INTEREST USING DEPENDENCY PARSING AND LINGUISTIC HEURISTICS" filed concurrently herewith, which is hereby incorporated.

BACKGROUND OF THE INVENTION

Field of the Invention

The present invention generally relates to natural language processing, and more particularly to sentiment analysis for natural language text.

Description of the Related Art

As interactions between users and computer systems become more complex, it becomes increasingly important to provide a more intuitive interface for a user to issue commands and queries to a computer system. As part of this effort, many systems employ some form of natural language processing. Natural language processing (NLP) is a field of computer science, artificial intelligence, and linguistics concerned with the interactions between computers and human (natural) languages. Many challenges in NLP involve natural language understanding, that is, enabling computers to derive meaning from human or natural language input, and others involve natural language generation allowing computers to respond in a manner familiar to a user. For example, a non-technical person may input a natural language question to a computer system, and the system intelligence can provide a natural language answer which the user can hopefully understand. Examples of an advanced computer systems that use natural language processing include virtual assistants, Internet search engines, and deep question answering (cognitive) systems.

A cognitive system is a form of artificial intelligence that uses machine learning and problem solving. A modern implementation of artificial intelligence is the IBM Watson™ cognitive technology, which applies advanced natural language processing, information retrieval, knowledge representation, automated reasoning, and machine learning technologies to the field of open domain question answering. Different techniques can be used to analyze natural language, identify sources, find and generate hypotheses, find and score evidence, and merge and rank hypotheses. Models for scoring and ranking the answer can be trained on the basis of large sets of question (input) and answer (output) pairs. The more algorithms that find the same answer independently, the more likely that answer is correct, resulting in an overall score or confidence level. One exemplary application of NLP using cognitive technology is the detection of financial crimes such as fraud.

Text analysis is known in the art pertaining to NLP. Text analysis typically uses a text annotator program to search text documents and analyze them relative to a defined set of tags. The text annotator can then generate linguistic annotations within the document to extract concepts and entities that might be buried in the text, such as extracting person, location, particular objects and organization names, or identifying positive and negative sentiment, i.e., whether a person is commenting favorably or unfavorably on a topic. One method of analyzing a natural language sentence is to construct various tree-like structures for the sentence such as a parse tree or a dependency tree. Dependency parsing is the technique of parsing text according to the grammar of the particular language in order to identify how a given word gets modified by other (dependent) words.

SUMMARY OF THE INVENTION

The present invention in at least one embodiment is generally directed to a method of determining targeted sentiment by receiving a natural language statement in computer-readable form, identifying a plurality of entities in the natural language statement, selecting a single one of the entities as a subject of interest, generating a dependency tree for the natural language statement, finding a subtree in the dependency tree that contributes to a sentiment polarity of the subject of interest, and computing a targeted sentiment score for the subject of interest based on sentiment expressed in the subtree. The computation may for example be averaging of sentiment polarity values for different sentiment words in the subtree. In a preferred implementation consecutively occurring nouns in the natural language statement are collapsed into a noun phrase in the dependency tree, and possessives with ensuing nouns are collapsed into a noun phrase. Multiple subtrees can be found that contribute to the sentiment polarity of the subject of interest, with sentiments expressed in each of the subtrees contributing to the targeted sentiment score. The sentiment expressed in the subtree can be modified using various linguistic heuristics. For example, sentiment polarity in the subtree which is modified by a negation word may be inverted, sentiment polarity which is modified by an intensifying word may be increased, or sentiment polarity which is modified by a diluting word may be decreased.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

Figure 1:
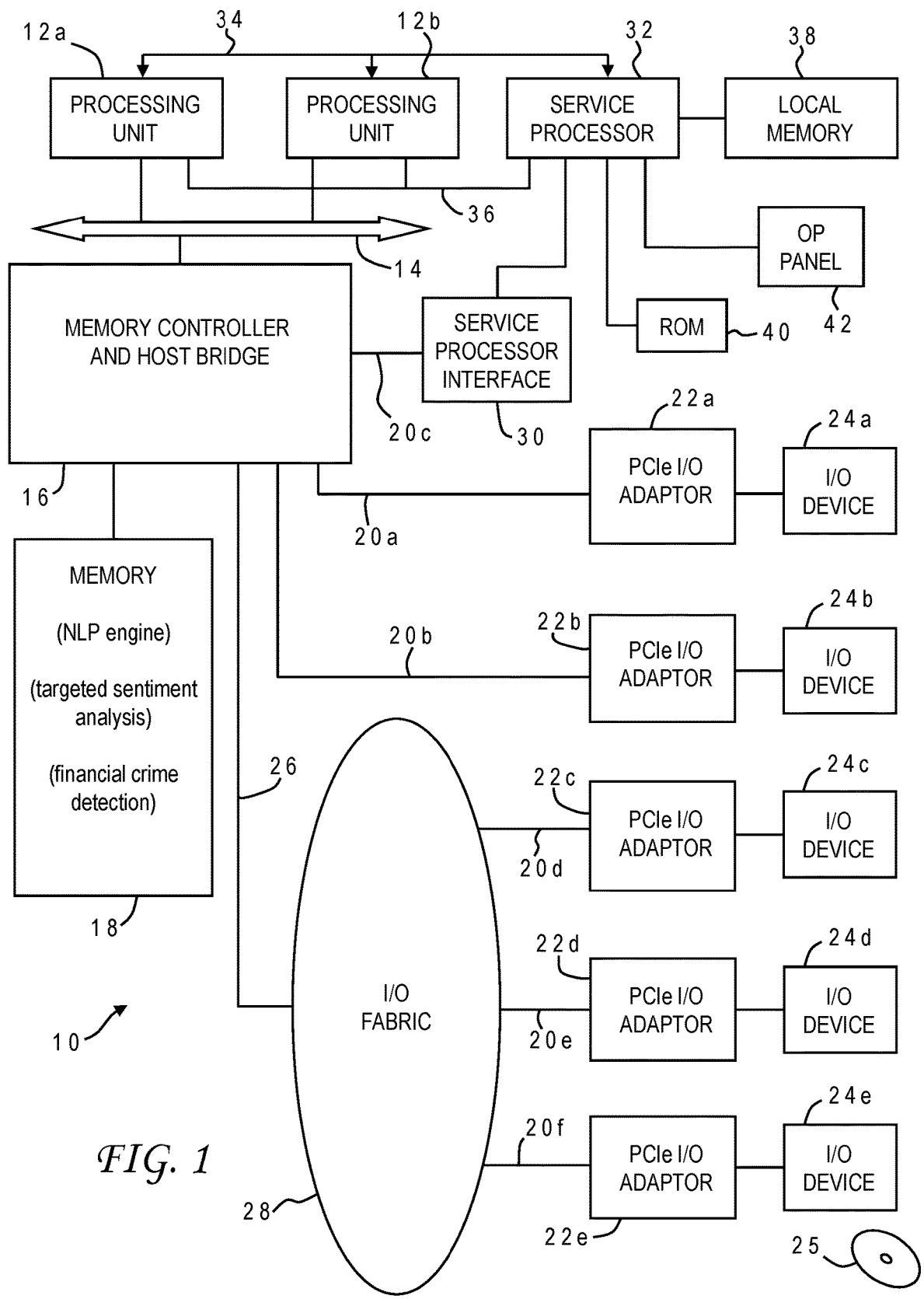
FIG. 1 is a block diagram of a computer system programmed to carry out sentiment analysis and fraud detection in accordance with one implementation of the present invention.

Sentiment analysis has been a challenging problem for some time now. Understanding the sentiment hidden in a passage of text essentially conveys the sentiment of the person who wrote the text. Most existing approaches for sentiment analysis attribute the sentiment to the entire text. For example, there are generic (non-targeted) sentiment analysis approaches that use supervised machine learning techniques such as conditional random fields, decision trees, support vector machines, etc. It can be argued, however, that the sentiment should be attributed to specific entities within the text. Consider this text: "The Times reports that the approval ratings of Mr. Jones have been steadily declining." There are two different entities in this text. Depending upon which one of these is the subject of interest, the associated sentiment is different. If the subject of interest is the Times, the sentiment is neutral to weakly positive. However, if the subject of interest is Mr. Jones, the sentiment is quite negative.

There are limited approaches to targeted sentiment analysis. However, they typically use artificial neural networks for finding targeted sentiment, thus mandating the availability of a large amount of training data. Other approaches use rule-based algorithms for targeted sentiment analysis, but do not consider grammatical structure, and as a result they are not scalable. It would, therefore, be desirable to devise an improved method of targeted sentiment analysis that could operate without supervision, and require no training data. It would be further advantageous if the method could be more scalable. The present invention in its various embodiments achieves these and other advantages based on grammatical parsing, augmented with heuristics. Given a passage of text, a dependency tree is established for each sentence. At runtime, given an entity (i.e., subject of interest), a subtree is found that contributes to the polarity of the entity based on the presence of sentiment words. In identifying the entity of interest, the method of the present invention can collapse consecutively occurring nouns into a single noun phrase, as well as concatenate possessives with an ensuing noun phrase. Heuristics can be applied for sentiment negation (e.g., "not bad"), intensifiers (e.g., "extremely good"), and diminishers (e.g., "little consolation"). The sentiment in the given entity's subtree can be aggregated in any statistical manner. For example, the system can compute either an average or a total of the polarity scores of the constituent sentiment words based on the lexicon, but other aggregation methods may suffice. In this context, "lexicon" refers to a collection of sentiment bearing words along with the sentiment associated with them, such as ["good", +2], ["bad", −2], ["great", +3], ["normal", 0], etc. The aggregated sentiment polarity is then preferably normalized to within the same interval as the polarities of the words in that of the lexicon. For instance, if the polarities of the lexicon range from −4 (most negative) to +4 (most positive), the aggregate sentiment polarity can be normalized to within the same interval. This normalization is essential if the aggregate computed can mathematically exceed the interval. For example, if the aggregate is computed as a total, then it may not lie in the closed interval between −4 and +4. The end result is a computed sentiment which is focused towards a given entity within the given passage of text. More generally, the approach can compute separate sentiment polarities for every entity within the text, or for a set of entities. The invention thereby provides a significant improvement in the technological field of natural language processing, i.e., human-machine interactions, by allowing a machine (computer system) to better understand and respond to human statements.

With reference now to the figures, and in particular with reference to FIG. 1, there is depicted one embodiment 10 of a computer system in which the present invention may be implemented to carry out sentiment analysis, as well as using that analysis for other concerns such as detecting fraud or other financial crimes. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein one or more applications in accordance with the present invention, such as a natural language processing engine, the targeted sentiment analysis, and fraud detection.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20*c* connects MC/HB 16 to a service processor interface 30 to allow communications between I/O device 24*a* and a service processor 32. Service processor 32 is connected to processors 12*a*, 12*b* via a JTAG interface 34, and uses an attention line 36 which interrupts the operation of processors 12*a*, 12*b*. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12*a*, 12*b* and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12*a*, 12*b* for execution of the program code, e.g., an operating system (OS) which is used to launch applications and in particular the targeted sentiment analysis application of the present invention, results of which may be stored in a hard disk drive of the system (an I/O device 24). While host processors 12*a*, 12*b* are executing program code, service processor 32 may enter a mode of monitoring and reporting any operating parameters or errors, such as the cooling fan speed and operation, thermal sensors, power supply regulators, and recoverable and non-recoverable errors reported by any of processors 12*a*, 12*b*, memory 18, and MC/HB 16. Service processor 32 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for natural language processing (NLP) that uses novel text analysis and linguistic heuristic techniques to focus sentiment analysis on a selected target or set of targets. Accordingly, a program embodying the invention may additionally include conventional aspects of various NLP tools, and these details will become apparent to those skilled in the art upon reference to this disclosure.

Figure 2:
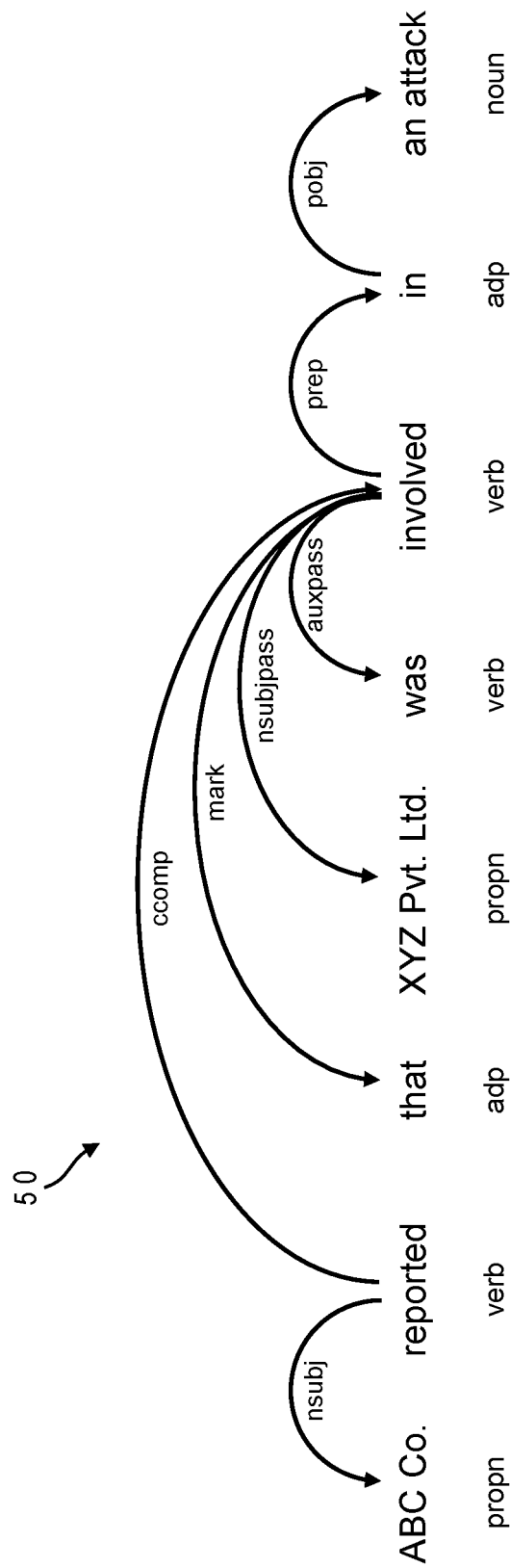
FIG. 2 is a pictorial representation of a dependency tree for an exemplary sentence which may be analyzed for sentiment in accordance with one implementation of the present invention.

Referring now to FIG. 2, there is depicted a dependency parsing tree 50 for a sentence to which the present invention may be applied. The sentence is "ABC Co. reported that XYZ Pvt. Ltd. was involved in an attack." This sentence is just one example of a natural language statement and should not be construed in any limiting sense as the present invention is applicable to any passage of human (natural language) text, whether a question or answer or other statement type, including incomplete sentences, in English or in other languages. The passage can come from any source, and may be extracted from documents available electronically, e.g., on the Internet or other news sources, or could even be derived from recorded speech subjected to voice recognition. Dependency parsing is the technique of parsing text according to the grammar of the particular language in order to identify how a given word gets modified by other, dependent words. Different approaches can be used for generating the dependency tree. Further to this example, dependency tree 50 is obtained using the spaCy open-source library for NLP written for the Python programming language. The spaCy algorithms use convolutional neural network models for tagging, parsing and entity recognition. Thus each term (word or set of words) in the sentence is assigned a tag indicting the type of term involved, or part-of-speech (POS). "ABC Co." is a proper noun as is "XYZ Pvt. Ltd.", "an attack" is a noun, "reported", "was" and "involved" are verbs, and "that" and "in" are adpositions. These tags are not exhaustive and terms in other passages may fall under different tags such as adjectives, adverbs, conjunctions, determiners, numerals, particles, pronouns, punctuation, etc., as is known in the art.

Dependency tree 50 also shows dependency relationships between terms signified by the curved arrows. FIG. 2 identifies seven separate dependencies: "at attack" is the prepositional object (pobj) modifying "in"; "in" is the preposition (prep) modifying "involved"; "involved" is also modified by "was" as a passive auxiliary (auxpass), "XYZ Pvt. Ltd." as a passive nominal subject (nsubjpass), and "that" as a marker (mark); "reported" is modified by "involved" as a clausal complement (ccomp), and by "ABC Co." as a nominal subject (nsubj). Again, these particular instances of dependency types are not exhaustive, and some dependency types are language specific. While the current disclosure limits the discussion to computing targeted sentiment using dependency parsing in the English language, the idea discussed herein is generic enough to be applied to any other language so long as it is possible to perform dependency parsing in that language.

In these examples, the given word that is modified is known as the "head" word, while the dependent word is known as the "child" word. This relationship is further illustrated in FIG. 3 which shows a subtree 52 (in the case, the beginning portion) of dependency tree 50 for the clause "ABC Co. reported". According to this parse, the word "reported" is the head word, and the word "ABC Co." is the child word. Thus, each dependency in this tree consists of three components: a given term (child), its head word, and the dependency type between the term and the head word. The term "Dep" is used for the arc label, which describes the type of syntactic relation that connects the child to the head. Since the syntactic relations form a tree, every child word has exactly one head. One can therefore traverse all the arcs in the tree by iterating over all the words in the sentence. In the example of FIG. 2, there are seven total subtrees each having a head word and a child word.

Figure 4:
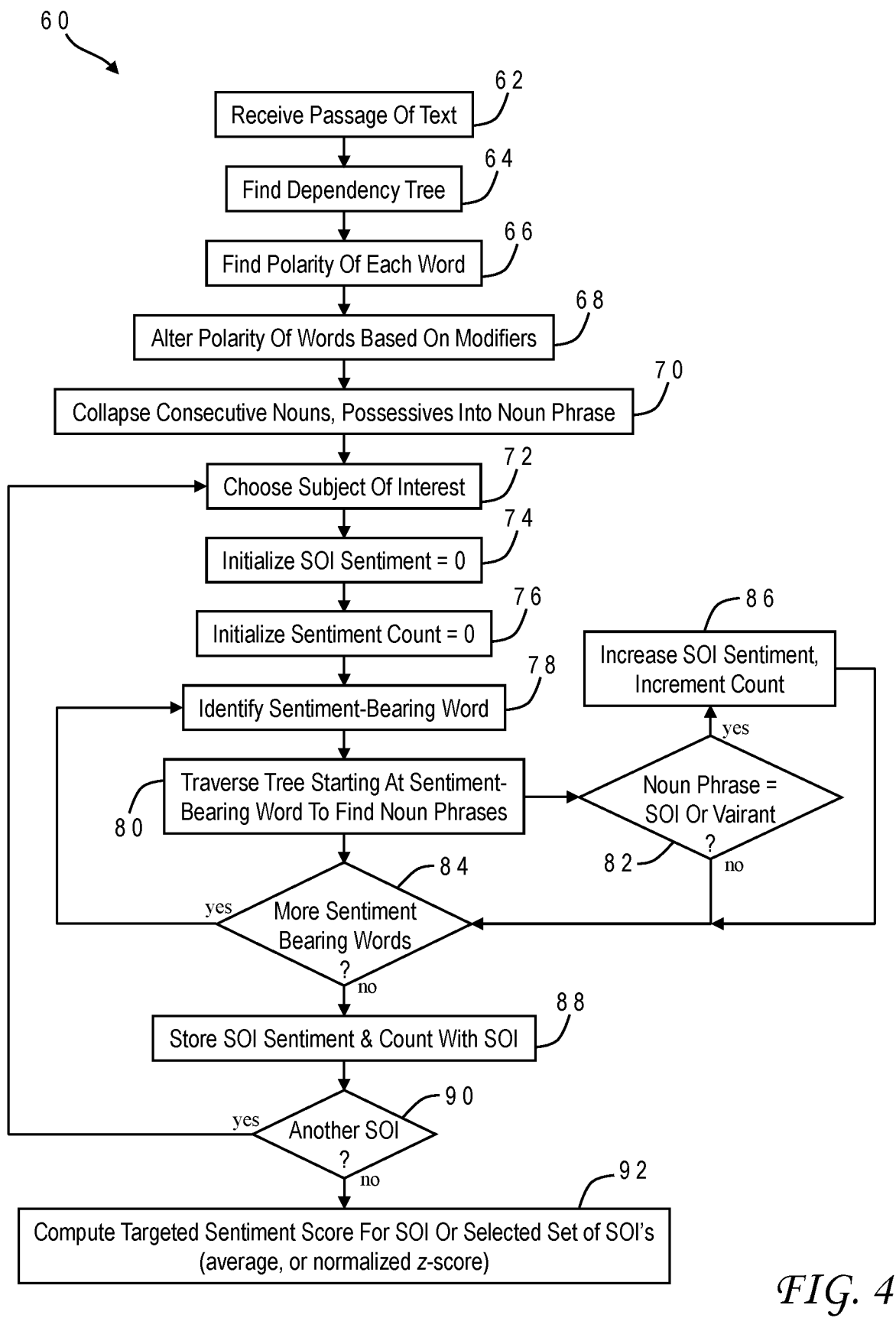
FIG. 4 is a chart illustrating the logical flow for a targeted sentiment analysis process in accordance with one implementation of the present invention.

This dependency parsing forms the foundation for the sentiment analysis carried out by the present invention, one implementation of which is illustrated in the flow chart of FIG. 4. According to this implementation the process 60 for targeted sentiment analysis, which may be carried out using a computer system such as computer system 10, begins by receiving the particular passage of text to be scrutinized in electronic form, i.e., computer-readable (62). The dependency tree for the passage is constructed using conventional means (64). The polarity of each word in the passage is then found (66). The polarity of a given word (a numerical value) can be determined using any predefined lexicon, such as those described by Pavlopoulos in his thesis "ASPECT BASED SENTIMENT ANALYSIS" found at Internet URL http://www2.aueb.gr/users/ion/docs/pavlopoulosphd thesis.pdf, by SentiWordNet at Internet URL http://sentiwordnet.isti.cnr.it, or by the Natural Language Toolkit Project at Internet URL http://www.nitk.org. The polarities can be further modified in different ways. In the preferred implementation this includes altering the polarity of words based on certain modifiers that invert, intensify or dilute the polarity based on linguistic heuristics/rules (68). For example, if a negation word such as "not" or "isn't" is found, the polarity of the succeeding sentiment bearing word is inverted. If an intensifying word such as "extremely" is found, the polarity of the succeeding sentiment bearing word can be increased, e.g., doubled; in general, the scale by which the polarity is increased is configurable. If a diluting word such as "hardly" is found, the polarity of the succeeding sentiment bearing word is decreased, e.g., halved; in general, the scale by which the polarity is decreased is also configurable. Certain terms may additionally be consolidated into a noun phrase, i.e., a single subject or object (70). For example, consecutively occurring nouns can be collapsed into a single noun phrase in the dependency tree, e.g., "US President John Kennedy". Possessives with ensuing noun phrases in the dependency tree can also be collapsed, e.g., "John Kennedy's presidency".

At this point in process 60, most of the words or phrases in the passage of text have been assigned numerical values representing their associated sentiment. Some words will not bear any sentiment, i.e., their sentiment is zero. The remainder of the process uses this information in a selective manner to arrive at a targeted sentiment value with respect to a particular subject of interest in the passage, or a set of subjects. The next step is accordingly to choose the subject of interest (SOI) for the sentiment analysis (72). This step may be performed manually, or may be predetermined as part of a screening that is looking at multiple passages regarding a specific entity. If the analysis is to be confined to only a single SOI, then it may be chosen at the outset of the process rather than later in a loop as shown in FIG. 4. A sentiment score for the current SOI is initialized, i.e., set to zero (74). A sentiment count is also initialized, i.e., set to zero (76). For each sentiment-bearing word (78), the dependency tree is traversed starting with that sentiment word, finding any dependent noun phrases (i.e. subjects or objects) attached to it (80). Each such noun phrase found is checked to see if it is the SOT, a variant of the SOI, or contains the SOI (82). Variants can be identified using conventional entity equivalents routines, e.g., "John Doe", "J Doe", and "John C Doe" can all be normalized to "John Doe". If the sentiment-bearing word is not related to the SOI, the process checks for other sentiment-bearing words (84), and returns iteratively to box 78. If the sentiment-bearing word is related to the SOI, the SOI sentiment score is increased by the amount of the sentiment for the sentiment-bearing word, and the sentiment count is incremented (86), in other words:

sentiment_SOI=sentiment_SOI+polarity_of_sentiment_word
sentiment_count_SOI=sentiment_count_SOI+1.

Once these calculations have been performed for each relevant sentiment-bearing word, the SOI sentiment score can be stored along with the SOI for subsequent processing (88). If there are other SOIs (90), the process returns iteratively to box 72 to calculate multiple SOI sentiment scores, one for each SOI. The final targeted sentiment score of the SOI can be computed in various manners (92). In a simpler implementation, as long as the sentiment count is greater than zero, the final targeted sentiment score is the return average sentiment, i.e., final_sentiment_SOI=sentiment_SOI/sentiment_count_SOI.

In a more refined implementation, the final targeted sentiment score is the total sentiment polarity (sentiment_SOI) normalized to within the same interval as that of the lexicon used for the base polarity values. This normalization may be accomplished by computing the z-score of the total sentiment polarity (z-score is conventional statistical measure of how far removed a value is from the mean in multiples of the standard deviation). This step may optionally involve normalizing the average in contrast with the variance of the sentiment polarities, e.g., using z-scores.

Advantageously, the approach of the present invention can be used to detect targeted sentiments for a set of subjects of interest and not just a single SOL The set may include all entities found in the passage to form an overall sentiment for the passage.

The present invention may be further understood with regard to an example of how sentiment analysis can be targeted in a larger passage with regard to a specific SOL According to this example a financial oversight system wants to evaluate information pertaining to "XYZ Bank" (the subject of interest), and has found the following passage in a news article:

"XYZ Bank, ex-CEO charged over Qatar rescue amid financial crisis on Tuesday. XYZ Bank and four former executives were charged with conspiracy to commit fraud during the bank's 2018 capital raising from Qatar as XYZ Bank sought to avoid a bailout amid one of the most turbulent periods in financial history. The Serious Fraud Office said Tuesday former Chief Executive Officer John Smith, former chairman of investment banking for the Middle East Roger Jones, ex-wealth chief Thomas Doe, and Richard Williams, the former European head of the bank's financial institutions group, face charges along with XYZ Bank. The four men are the most senior U.K. banking executives charged since the financial crisis, XYZ Bank sent banks across the globe scrambling to raise funds to cover billions in losses. The charges relate to XYZ Bank's capital arrangements with Acme Holding, an investment vehicle of the country's then prime minister. XYZ Bank is also facing a 750-million-pound lawsuit from PCP Capital Partners' Amanda Staveley over the fundraising."

Figures 3, 5:
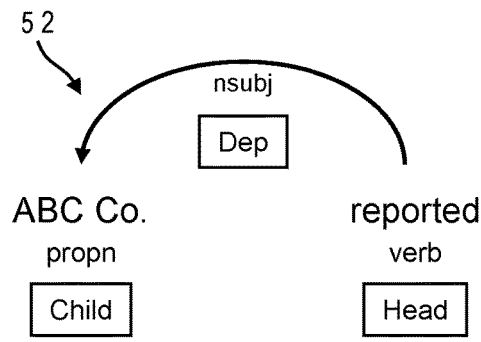
FIG. 3 is a portion of the dependency tree of FIG. 2 showing how dependency is found between a head word and a child word in accordance with one implementation of the present invention.
FIG. 5 is a table showing entities from a passage of text with corresponding sentiment words and their polarities in accordance with one implementation of the present invention.

FIG. 5 shows a table 100 with the sentiment-bearing words from this passage that roll up to the SOI in the dependency tree along with their sentiment polarities. Here the total sentiment score of the SOT will be an average of the sentiment scores attached to both "SOT" and "SOT and four former executives". The system carrying out the sentiment analysis would therefore return −1.46 as the targeted sentiment polarity for the SOT, that is, the sum of the five associated sentiment contributors divided by the number of contributors, i.e., [−0.4+−0.9+−0.8+−2.4+−2.8]/5. In contrast, the overall (non-targeted) sentiment for the above text would be −0.198 using the conventional NLTK model noted above. It is understood that table 100 only shows a subset of terms for the sake of brevity. There are other terms in the passage that would be included in table 100. Likewise, only some related words (e.g., "bailout" and "lawsuit" for "XYZ Bank") are shown but other related words can be included in the analysis. In this same manner, this passage can be used to yield a sentiment value for a set of SOI's.

Figure 6:
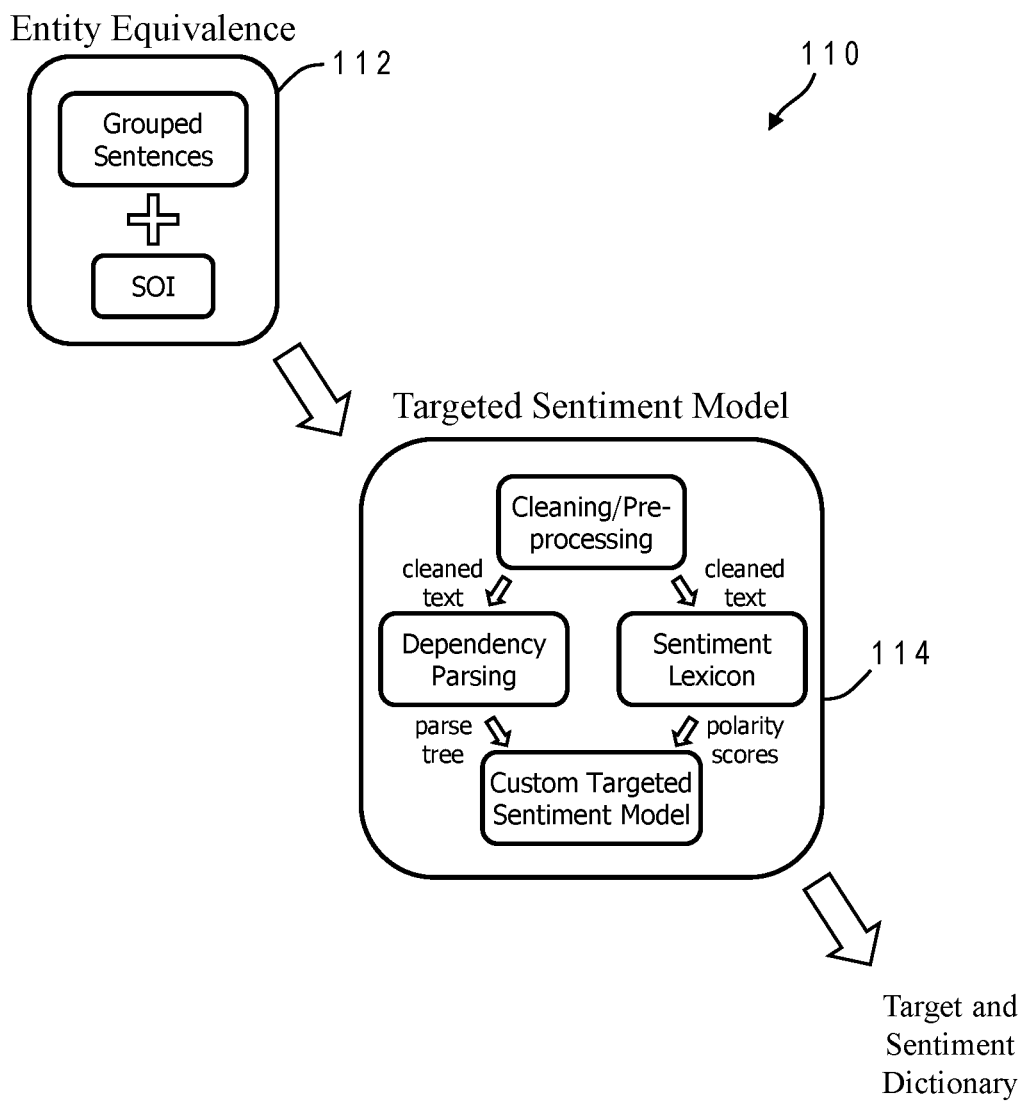
FIG. 6 is a high-level block diagram depicting how entity equivalence among grouped sentences for a given subject of interest (SOI) is used to construct a targeted sentiment model which can in turn be used to generate a target and sentiment dictionary in accordance with one implementation of the present invention.

FIG. 6 provides a visual representation of the approach described above. Entity equivalence 112 is carried out as discussed above (conventionally), e.g., "John Doe", "J Doe", and "John C Doe" all become "John Doe". This entity equivalence is carried out for all grouped sentences and any subjects of interest. The grouped sentences with entity equivalence become the basis for the targeted sentiment model 114. Targeted sentiment model 114 can clean (pre-process) the text. This may include filtering out extraneous words that add little or no meaning (content), and checking for any misspellings and correcting where necessary. Dependency parsing and sentiment lexicon is applied to the cleaned text, the parse tree and polarity scores are used to construct the custom targeted sentiment model. The final result is a target and sentiment dictionary, that is, a collection of key-value pairs where the key is an entity or SOT and the value is the targeted sentiment associated with it (as computed by the present invention). The dictionary is basically a data structure that informs the targeted sentiment computed for each of a plurality of entities.

Figure 7:
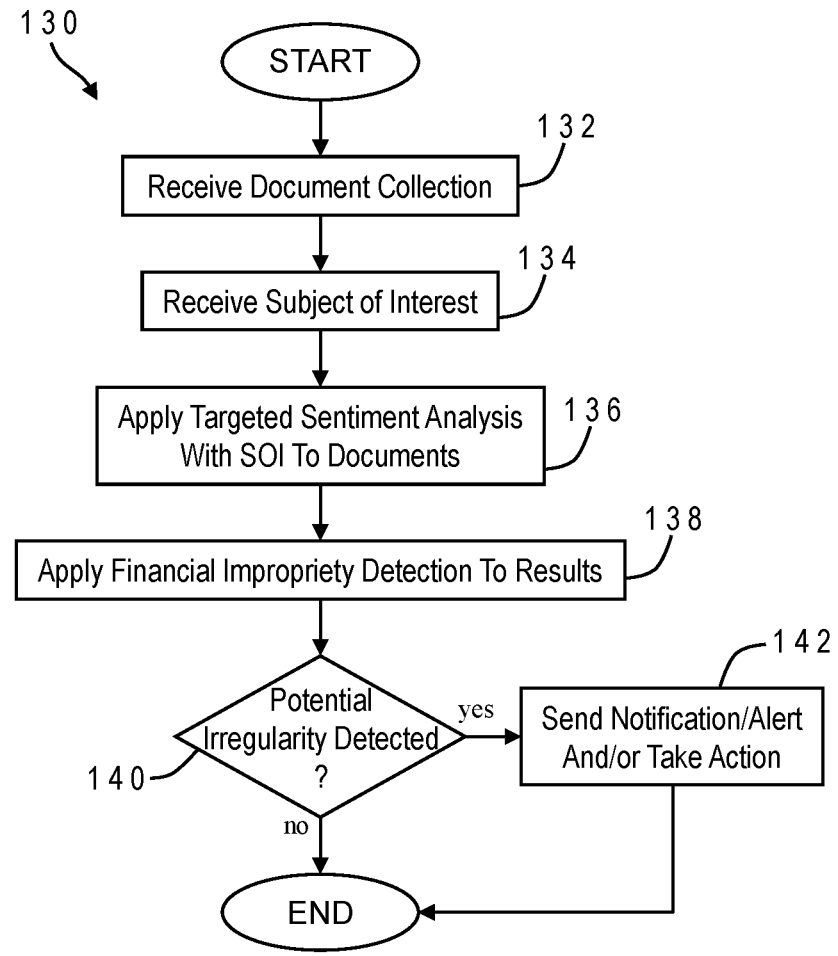
FIG. 7 is a chart showing the logical flow for a process for detecting financial crimes or other financial irregularities in accordance with one implementation of the present invention.

There are numerous applications of the present invention once the targeted sentiment analysis has been carried out. Some valuable applications in particular involve financial investigation, such as detecting financial crimes or other financial irregularities, due diligence for vendor selection or customer onboarding (checking if a vendor or customer has ownership issues, financial risks, outlook within the industry, etc.), and risk rating of companies based on sections indicated for financial crimes due diligence. FIG. 7 illustrates the logical flow for one example of a process 130 for detecting financial crimes or other financial irregularities in accordance with one implementation of the present invention. Financial crimes may involve, without limitation, fraud (checking account fraud, credit card fraud, mortgage fraud, medical fraud, corporate fraud, securities fraud, bank fraud, insurance fraud, market manipulation, payment (point of sale) fraud, health care fraud), theft, scams or confidence tricks, tax evasion, bribery, embezzlement, identity theft, money laundering, and forgery and counterfeiting. Process 130 may be carried out in any convenient computer system, such as computer system 10, and begins by receiving a collection of documents to be analyzed 132. The user enters a subject of interest for the analysis 134. Multiple subjects of interest can be entered, for example, in the case of related entities (e.g., corporate affiliates, subsidiaries, etc.). Using the designated subject of interest, targeted sentiment analysis is then applied as described above to the collection of documents 136. Conventional financial impropriety detection can then be applied using the resulting target and sentiment dictionary 138. One example of financial impropriety detection is the IBM Financial Crimes Due Diligence with Watson service described at internet URL https://www.ibm.com/support/knowledgecenter/en/SS-CKRH_1.0.1/fcdd/c_component_ar chitecture.html. If no potential impropriety is detected 140, the process ends. If a potential impropriety is detected, the system responsively takes action such as generating an alert or flagging an account, or more serious intervention 142. In the simplest implementation an alert is generated to flag certain activity or an account as being suspicious and requiring further review by an analyst. The alert can be sent via any convenient method, such as a phone call or short message service (SMS) text to the analyst or investigator, or an email notification. More serious intervention can include a denial of privileges (e.g., suspending a bank or credit card account), or a referral to a criminal investigative unit.

The present invention thereby provides an improved methodology for sentiment analysis. The targeted sentiment analysis is useful with a wide variety of applications. These applications include, among others: reviews from e-commerce websites (e.g., Amazon) targeted towards specific products; reviews from restaurant and services rating platforms (e.g., Yelp) targeted towards specific dishes and services; reviews from app rating platforms (e.g., an App store) targeted towards specific product features and versions; and document ranking (e.g., news articles) with respect to a particular entity/entities. Unlike many conventional sentiment analysis systems, the present invention can be set up without supervision, and is easily scalable. Using a dependency parse tree gives more contextual information than other approaches, e.g., lexical positioning. Refinement of dependency parsing using linguistic heuristics such as noun phrase and possessives collapsing also leverages the intricacies in the English language to provide a superior result.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the linguistic heuristics described herein are applied to the English language but they are also applicable to other languages. Additional linguistic heuristics may be used for non-English languages. Some non-English languages are agglutinative. Tokenization in such languages is more complicated than it is in English. Sometimes two or more nouns, or an adjective and a noun, or a modifier and a noun, or any other such combination of words may be fused into a single word. One possible heuristic for such cases is to remove the agglutination, i.e., decompose the single complex word into it constituent simple words. Then the process would proceed with the rest of the sentiment computation. It is therefore contemplated that such modifications can be made without departing from the spirit or scope of the present invention as defined in the appended claims.

What is claimed is:

1. A method of determining a targeted sentiment comprising:
   receiving a natural language statement in computer-readable form, by executing first instructions in a computer system;
   identifying a plurality of entities in the natural language statement, by executing second instructions in the computer system;
   selecting a single one of the entities as a subject of interest, by executing third instructions in the computer system;
   generating a dependency tree for the natural language statement, by executing fourth instructions in the computer system;
   finding a subtree in the dependency tree wherein the subtree contributes to a sentiment polarity of the subject of interest, by executing fifth instructions in the computer system;
   computing a numeric targeted sentiment score for the subject of interest based on sentiment expressed in the subtree, by executing sixth instructions in the computer system wherein the numeric targeted sentiment score is normalized based on a distribution of sentiment values associated with words in a sentiment lexicon used in determining the sentiment polarity; and using a cognitive system to detect financial impropriety related to the subject of interest based on the numeric targeted sentiment score.

2. The method of claim 1 wherein said computing includes averaging a plurality of sentiment polarity values for different sentiment words in the subtree.

3. The method of claim 1 further comprising:
collapsing consecutively occurring nouns in the natural language statement into a first single noun phrase in the dependency tree; and
collapsing a possessive word with an ensuing noun in the natural language statement into a second single noun phrase in the dependency tree.

4. The method of claim 1 wherein the subtree is a first subtree and said finding further identifies multiple subtrees in the dependency tree including the first subtree wherein the multiple subtrees each contribute to a sentiment polarity of the subject of interest, and said computing bases the numeric targeted sentiment score on sentiments expressed in each of the subtrees.

5. The method of claim 1 further comprising modifying the sentiment expressed in the subtree using a linguistic heuristic.

6. The method of claim 5 wherein the linguistic heuristic includes one of:
inverting sentiment polarity in the subtree wherein the sentiment polarity is modified by a negation word;
increasing sentiment polarity in the subtree wherein the sentiment polarity is modified by an intensifying word; and
decreasing sentiment polarity in the subtree wherein the sentiment polarity is modified by a diluting word.

7. A computer system comprising:
one or more processors which process program instructions;
a memory device connected to said one or more processors; and
program instructions residing in said memory device for determining a targeted sentiment by receiving a natural language statement in computer-readable form, identifying a plurality of entities in the natural language statement, selecting one of the entities as a subject of interest, generating a dependency tree for the natural language statement, finding a subtree in the dependency tree wherein the subtree contributes to a sentiment polarity of the subject of interest, computing a numeric targeted sentiment score for the subject of interest based on sentiment expressed in the subtree wherein the numeric targeted sentiment score is normalized based on a distribution of sentiment values associated with words in a sentiment lexicon used in determining the sentiment polarity, and using a cognitive system to detect financial impropriety related to the subject of interest based on the numeric targeted sentiment score.

8. The computer system of claim 7 wherein the computing includes averaging a plurality of sentiment polarity values for different sentiment words in the subtree.

9. The computer system of claim 7 wherein said program instructions further collapse consecutively occurring nouns in the natural language statement into a first single noun phrase in the dependency tree, and collapse a possessive word with an ensuing noun in the natural language statement into a second single noun phrase in the dependency tree.

10. The computer system of claim 7 wherein the subtree is a first subtree and said program instructions further find multiple subtrees in the dependency tree including the first subtree wherein the multiple subtrees each contribute to a sentiment polarity of the subject of interest, and said computing bases the numeric targeted sentiment score on sentiments expressed in each of the subtrees.

11. The computer system of claim 7 wherein said program instructions further modify the sentiment expressed in the subtree using a linguistic heuristic.

12. The computer system of claim 11 wherein the linguistic heuristic includes one of:
inverting sentiment polarity in the subtree wherein the sentiment polarity is modified by a negation word;
increasing sentiment polarity in the subtree wherein the sentiment polarity is modified by an intensifying word; and
decreasing sentiment polarity in the subtree wherein the sentiment polarity is modified by a diluting word.

13. A computer program product comprising:
a computer readable storage medium; and
program instructions residing in said storage medium and implemented by one or more processors for determining a targeted sentiment by receiving a natural language statement in computer-readable form, identifying a plurality of entities in the natural language statement, selecting one of the entities as a subject of interest, generating a dependency tree for the natural language statement, finding a subtree in the dependency tree wherein the subtree contributes to a sentiment polarity of the subject of interest, computing a numeric targeted sentiment score for the subject of interest based on sentiment expressed in the subtree wherein the numeric targeted sentiment score is normalized based on a distribution of sentiment values associated with words in a sentiment lexicon used in determining the sentiment polarity, and using a cognitive system to detect financial impropriety related to the subject of interest based on the numeric targeted sentiment score.

14. The computer program product of claim 13 wherein the computing includes averaging a plurality of sentiment polarity values for different sentiment words in the subtree.

15. The computer program product of claim 13 wherein said program instructions further collapse consecutively occurring nouns in the natural language statement into a first single noun phrase in the dependency tree, and collapse a possessive word with an ensuing noun in the natural language statement into a second single noun phrase in the dependency tree.

16. The computer program product of claim 13 wherein the subtree is a first subtree and said program instructions further find multiple subtrees in the dependency tree including the first subtree wherein the multiple subtrees each contribute to a sentiment polarity of the subject of interest, and said computing bases the numeric targeted sentiment score on sentiments expressed in each of the subtrees.

17. The computer program product of claim 13 wherein said program instructions further modify the sentiment expressed in the subtree using a linguistic heuristic.

18. The computer program product of claim 17 wherein the linguistic heuristic includes one of:
inverting sentiment polarity in the subtree wherein the sentiment polarity is modified by a negation word;
increasing sentiment polarity in the subtree wherein the sentiment polarity is modified by an intensifying word; and
decreasing sentiment polarity in the subtree wherein the sentiment polarity is modified by a diluting word.

* * * * *